(No Model.)

J. W. ANDERSON.
OVEN FOR BAKING JAPANNED WARE.

No. 459,432. Patented Sept. 15, 1891.

Witnesses
Geo. B Laue
Danl. H. Herr.

Inventor
John W. Anderson
By his Attorney
Wm. R. Gerhart

THE NORRIS PETERS CO., PHOTO-LITHO., WASHINGTON, D. C.

UNITED STATES PATENT OFFICE.

JOHN W. ANDERSON, OF LANCASTER, PENNSYLVANIA.

OVEN FOR BAKING JAPANNED WARE.

SPECIFICATION forming part of Letters Patent No. 459,432, dated September 15, 1891.

Application filed May 23, 1889. Serial No. 311,794. (No model.)

*To all whom it may concern:*

Be it known that I, JOHN W. ANDERSON, a citizen of the United States, residing in Lancaster, in the county of Lancaster and State of Pennsylvania, have invented certain Improvements in Devices for Baking Japanned Ware, of which the following is a specification.

This invention relates to improvements in ovens for baking japanned ware; and the objects of my improvements are, first, to thoroughly dry the ware and carry all moisture from the oven by passing a current of hot air over the goods; second, to maintain an equal temperature throughout the whole oven, so as to bake the goods to a uniform color, and, third, to apply superheated steam to the baking of japanned ware. I attain these objects by the mechanism illustrated in the accompanying drawings, in which—

Figure 3:
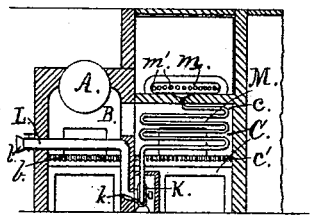
Figure 2:
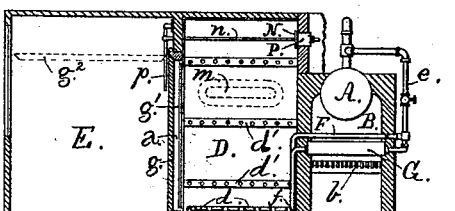
Figure 1:
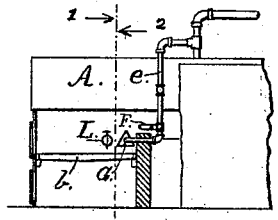
Figure 5:
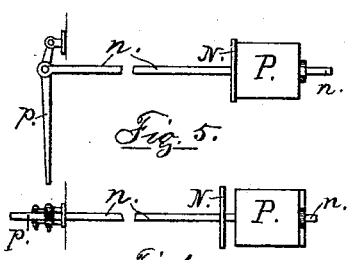
Figure 6:
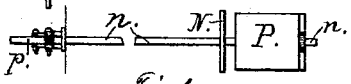
Figure 4:
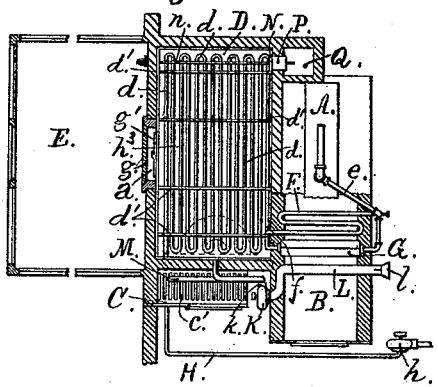
Figure 7:
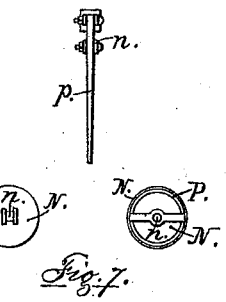
Figure 8:
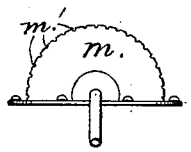
Figure 9:
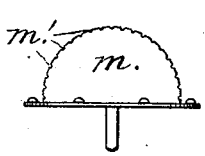
Figure 10:
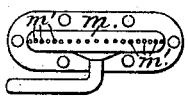
Figure 11:
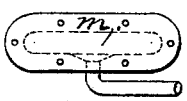
Figures 12, 13:
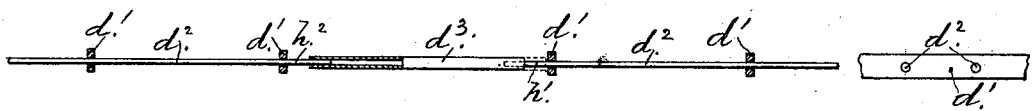

Figure 1 is a side elevation of the fire-chamber and boiler, showing the manner in which the steam is conveyed from the boiler to the fire-chamber. Fig. 2 is a vertical section through the fire-chamber and oven on the line $x\,x$, Fig. 1, viewing the same from the fire-chamber front, as shown by the arrow 1. Fig. 3 is a similar view on the same line, but looking from the rear of the fire-chamber, as shown by the arrow 2. Fig. 4 is a top view of all the parts, the walls of the heater, the oven, the vestibule of the oven, and a portion of the fire-chamber being shown in section. Fig. 5 is a side view of the valve closed, and Fig. 6 a top view of the same open. Fig. 7 shows detail views of the valve and lever. Fig. 8 is a bottom plan view of the drum; Fig. 9, a top plan view of the same; Fig. 10, a front, and Fig. 11 a rear, elevation of the same. Fig. 12 is a top view of one length of the rails of the frame for supporting the goods, and Fig. 13 a side view of a portion of one of the cross-beams of the same.

Similar letters indicate like parts throughout the several views.

In the drawings, A represents the boiler, B the fire-chamber beneath the boiler, and $b$ the grate.

C is the heater, $c$ the fire-chamber thereof, and $c'$ the grate.

D is the oven; $d$, the steam-coil in the bottom of the same; $d'$, the cross-beams of the frame for supporting the goods to be dried, and $d^2$ the longitudinal rails of the same.

E is the vestibule of the oven.

Steam is drawn from the boiler A, used for running the machinery for manufacturing the goods, and is conveyed from the top thereof by a pipe $e$ down the side of the boiler to the outside of the fire-chamber B. Here it is connected with a horizontal coil F, supported in the walls of the fire-chamber and by a T-joint with a steam-log G, triangular in cross-section, and also upheld by the walls of the fire-chamber in front of and below the coil, but above the grate $b$. The outlet ends of the coil F and log G are connected with the receiving end $f$ of the coil $d$ in the oven D. From the coil $d$ the steam escapes into a waste-pipe H, leading to an exhaust or suction fan $h$.

In the oven D there are located two frames, one being placed on each side of the door of the oven, and is composed of a series of cross-beams $d'$ and longitudinal rails $d^2$. Between these two frames there is a passage extending from the door to the back of the oven, and after the frames are filled with goods attached or hung thereto in the usual manner rails $d^3$ are successively extended across the said passage from the rear wall of the oven to the door and loaded with goods as they are placed in position. These rails $d^3$ are hollow, and in fitting them in place they are first pushed over the projecting end $h'$ of a rail $d^2$ on one side of the passage $h^3$ and then engaged with a corresponding projecting end $h^2$ of a rail $d^2$ on the other side of the passage, the projecting ends $h'\,h^2$ being of sufficient length to enable the end of a rail $d^3$ to be pushed over it far enough to be engaged with the one opposite, as shown in Fig. 12.

There are double doors leading into the oven, one $g'$ being of metal and having its inner face flush with the inner face of the wall when it is closed, and a second $g$ made of wood and located so that when closed its outer face is flush with the outer face of the wall. This outer door is hinged at the top, so that to open it the lower end is raised, as shown by the dotted lines $g^2$, Fig. 2. Its edges and those of the door-frame are cut to form a miter-joint when the door is closed, and in the joints there is placed packing of felt or other suitable material. There is a space $a$ between the two doors, forming an air-cushion. On the side of the oven on which the doors are placed there is a vestibule E, built to prevent the entrance of dust from other parts of the works.

At one end of the oven there is a heater C, placed in the fire-chamber c of which and above the grate-bars c' there is a vertical coil M of pipes located. Beneath one end of the heater C there is a fan-blower K, supplied with hot air by a feed-pipe L, which passes through the fire-chamber B above the grate b. The open end of this feed-pipe L, through which the air enters, is shown at l on the side of the fire-chamber B opposite to that on which the heater and fan-blower are placed. The nozzle k of the fan-blower connects with the lower end of the vertical coil M, and the upper end of that coil passes through the wall between the heater and the oven and discharges into a drum m, fastened to the end wall of the oven. This drum has a number of perforations m', in its front face through which the hot air forced into it by the fan-blower is distributed.

In the end of the oven opposite to that occupied by the drum m there is a horizontally-sliding valve N placed near the ceiling, which closes a flue P, leading into the smoke-stack Q of the fire-chamber B. It is operated by a hand-lever p on the outside of the oven in the vestibule E and connected therewith by a rod n.

In order to obtain to as great an extent as possible the full benefit of the fires at the side and end of the oven there is but a single wall placed between it and the fire-chamber B, and the back of the heater C is built into the end of the oven to form so much of that wall as its height will permit.

When japanned ware is placed in the oven to bake, it is more or less wet with the varnish into which it has been dipped, and it is desirable not only to dry the ware, but also to remove all moisture from the oven, as its presence there prevents the proper and uniform coloring of the goods. The employment of the flue leading to the smoke-stack assists to carry off this moisture as the air of the oven, heated by the steam-coil, expands. By the addition of the air-coil M there is a current of hot air passed through the oven and out of the flue P, thoroughly and rapidly drying the damp ware and carrying all moisture out through the flue. In addition to drying the goods the contact of the hot dry air with them gives them a much darker and richer color than can be otherwise obtained. The application of superheated steam to the baking of japanned ware avoids much injury constantly liable to be done to ware baked in the ovens as heretofore heated. By the old method of heating crevices and cracks are frequently made in the shell of the oven, admitting the gases from the fire, contact with which is fatal to the proper and uniform coloring of the ware. The suction-fan h draws the water of condensation and the steam of lower temperature from the coil in the oven and facilitates the entrance and passage through the same of the hotter steam from the coil in the fire-chamber B.

Having thus described my invention, what I claim as new, and desire to secure by Letters Patent, is—

1. In a device for baking japanned ware, the combination, with an oven having a portion of its wall formed by the adjacent wall of the fire-chamber of the heating apparatus, of a coil of steam-pipe located in the oven and having one end connected with a pipe located in a fire-chamber, a coil of air-pipe L, placed in a heater and having its discharge end extending into the oven and a flue connecting said oven and the smoke-stack, substantially as and for the purpose specified.

2. In a device for baking japanned ware, the combination, with an oven having a portion of its wall formed by the adjacent wall of the fire-chamber of the heating apparatus, of double doors leading into the oven and having a space between them to form an air-cushion, a coil of steam-pipe located in the oven and having one end connected with a pipe located in a fire-chamber, a coil of air-pipe L, placed in a heater and having its discharge end extending into the oven, and a flue connecting said oven and the smoke-stack, substantially as and for the purpose specified.

3. In a device for baking japanned ware, the combination, with an oven having a portion of its wall formed by the adjacent wall of the fire-chamber of the heating apparatus, of a coil of steam-pipe located in the oven and having one end connected with a steam-pipe located in a fire-chamber and the other with a suction-fan, a perforated drum secured in the oven, a coil of air-pipe placed in a heater, the discharge end of said air-coil opening into the drum and having the other connected with a blower, and a flue connecting said oven and the smoke-stack, substantially as and for the purpose specified.

JOHN W. ANDERSON.

Witnesses:
JACOB HALBACH,
WM. R. GERHART.